US010007535B1

United States Patent
Chopra et al.

(10) Patent No.: US 10,007,535 B1
(45) Date of Patent: Jun. 26, 2018

(54) METHOD AND SYSTEM FOR AN AUTOMATION FRAMEWORK FOR INTERNATIONALIZATION COMPLIANT APPLICATIONS

(75) Inventors: Shelesh Chopra, Bangalore (IN); Ankit Gupta, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 537 days.

(21) Appl. No.: 13/610,058

(22) Filed: Sep. 11, 2012

(51) Int. Cl.
*G06F 11/36* (2006.01)
*G06F 9/445* (2018.01)

(52) U.S. Cl.
CPC ...... *G06F 9/44589* (2013.01); *G06F 11/3696* (2013.01)

(58) Field of Classification Search
CPC ............... G06F 7/78; G06F 8/00–8/78; G06F 9/44–9/455; G06F 11/36
See application file for complete search history.

(56) References Cited

U.S. PATENT DOCUMENTS

| | | | | |
|---|---|---|---|---|
| 8,392,886 B2* | 3/2013 | Sweis et al. | | 717/125 |
| 2005/0188271 A1* | 8/2005 | West | | G06F 11/3684 714/38.1 |
| 2006/0130026 A1* | 6/2006 | McHugh et al. | | 717/141 |
| 2007/0006039 A1* | 1/2007 | Fichter | | G06F 11/3688 714/38.14 |
| 2009/0106764 A1* | 4/2009 | Klementiev | | G06F 9/454 718/104 |
| 2009/0222787 A1* | 9/2009 | Aldahleh | | G06F 9/454 717/101 |
| 2009/0276759 A1* | 11/2009 | Aoyama | | G06F 11/3684 717/124 |
| 2011/0296384 A1* | 12/2011 | Pasternak | | G06F 11/3688 717/124 |
| 2011/0307405 A1* | 12/2011 | Hammer | | G06Q 10/0831 705/331 |
| 2014/0249797 A1* | 9/2014 | Liu | | G06F 17/2288 704/2 |

OTHER PUBLICATIONS

Parab et al., Automate UI localization tests to save time and reduce errors, 2010 (Year: 2010).*
Shanthi, Localization and Internationalization Testing, 2006 (Year: 2006).*

* cited by examiner

*Primary Examiner* — H. Sough
*Assistant Examiner* — Zhan Chen
(74) *Attorney, Agent, or Firm* — Dergosits & Noah LLP; Todd A. Noah

(57) ABSTRACT

An automation framework for internationalization compliant applications is described. The automation framework includes a computer that executes a parser, an execution engine, and a logger. The parser parses a test case from a test case suite to identify script instructions to test an internationalization compliant application. The script instructions include a reference identifier. The execution engine executes the script instructions to test the internationalization compliant application, to identify at least one message identifier and at least one message string based on referencing a lookup database for an automation framework using the reference identifier, and to validate at least one message identifier and at least one message string with the internationalization compliant application. The logger logs a result of executing the script instructions, and outputs the result via an output device.

20 Claims, 3 Drawing Sheets

METHOD AND SYSTEM FOR AN AUTOMATION FRAMEWORK FOR INTERNATIONALIZATION COMPLIANT APPLICATIONS

BACKGROUND

Test automation is the use of software to control the execution of tests, the comparison of actual outcomes to predicted outcomes, the setting up of test preconditions, and other test control and test reporting functions. An automation framework is not a single tool to perform some specific testing task, but a set of tools that provide support for automated software testing in a unified manner, thereby providing a common platform for an automation engineer to do a job. If there is change to any test case for an application that is being tested, only the test case file needs to be updated, such that the driver script and startup script remain the same. The automation framework integrates the function libraries, test data sources, object details and various reusable modules. The automation framework is responsible for defining the format in which to express expectations, creating a mechanism to drive the application being tested, executing the tests, and reporting the results. Typically an automation framework resides on a host computer and includes a test initializer, a script parser, a script execution engine, and a logger that logs and reports the test results.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
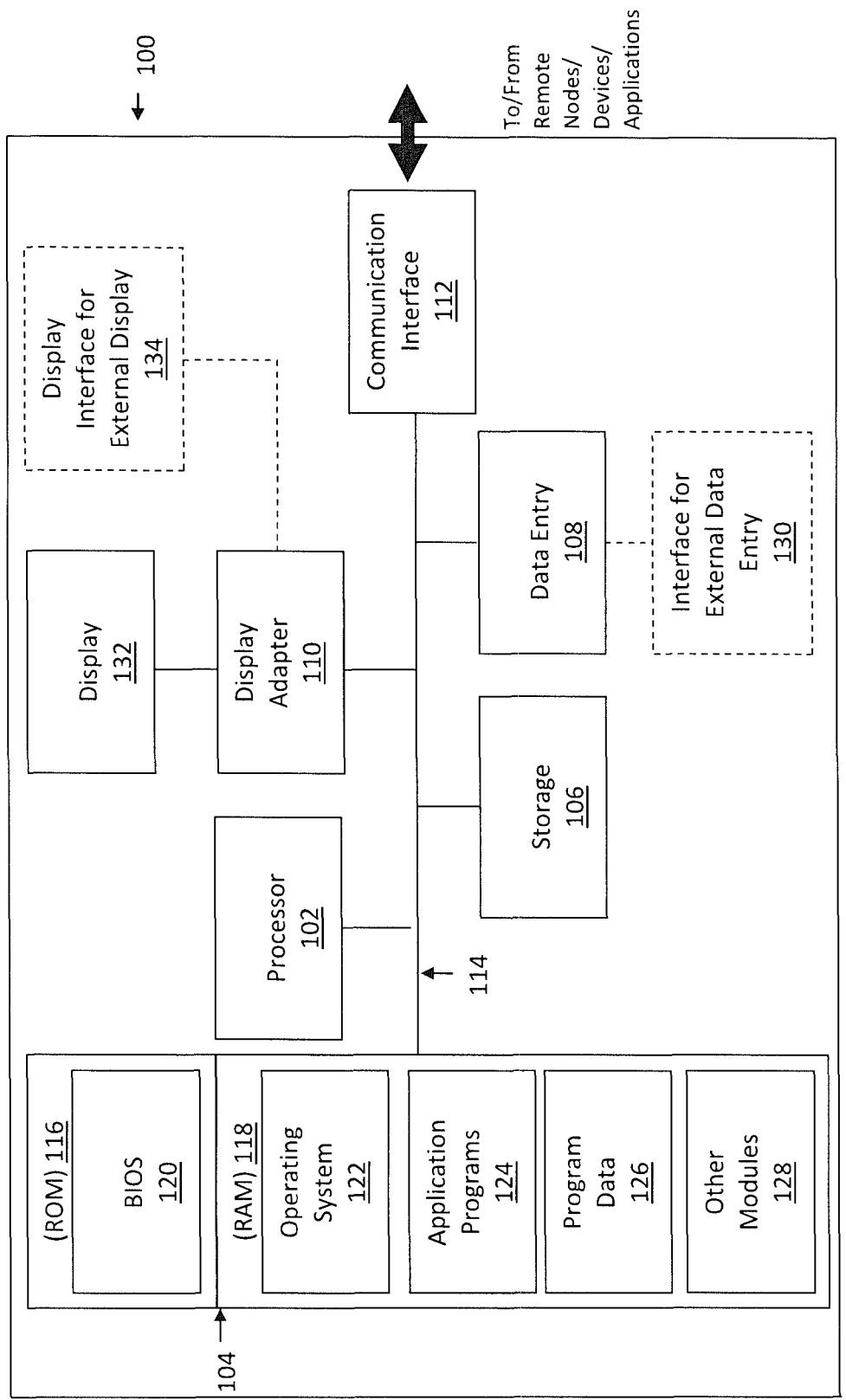
FIG. 1 is a block diagram illustrating an example hardware device in which the subject matter may be implemented.

In computing, internationalization is the process of designing a software application so that it can be adapted to various languages and regions of a target market without engineering changes. While an application that is not internationalization compliant typically includes hard coded message strings for communication with an application user, an internationalization compliant application typically includes message identifiers that reference message strings stored in a message catalog. For example, an internationalization compliant application enables a user to backup data and uses a message identifier "45678" to refer to a message string "backup failed" stored in the message catalog, provided that an application user specifies that the application language is English. For this example, the message catalog stores message strings for various translations of "backup failed" in case an application user specified that the application language was another language, such as Chinese, Hindi, Spanish, French, German, or Arabic. An internationalization compliant application uses the same message identifier to refer to different message strings in a message catalog, where the different message strings are referenced by the selection of the application language.

Many prior art automation frameworks for internationalization compliant applications include a significant amount of hard coding of business logic in the test scripts based on the assumption that the same message identifiers for internationalization compliant applications will always refer to the same message strings in the message catalog. However, requests for enhancements, workflow changes, and the correction of software bugs may often result in the changing of message identifiers and/or message strings. The hard coded business logic for prior art automation frameworks fail when checking message identifiers and message strings that are changed, and therefore need to be reworked. However, hard coded business logic that statically links message identifiers to message strings results in reduced maintainability and scalability for such prior art automation frameworks. Every time that a message identifier and/or a message string changes for an internationalization compliant application, a user may have to modify test script to create new business logic for a new test case. This prior art solution is not efficient because it comes with a very high operational overhead.

The subject matter presented herein provides an automation framework for internationalization compliant applications that offers solutions to prior art problems. The automation framework includes a computer that executes a synchronization engine, a parser, an execution engine, and a logger. Rather than business logic including hard coded message identifiers that may change, the business logic includes reference identifiers that remain constant while referencing the changing message identifiers and message strings, which are stored in an lookup database that is external to the test script. The synchronization engine identifies a modification for a message identifier and/or a message string stored in a message catalog for an internationalization compliant application. For example, the synchronization engine identifies a new message identifier "22305" that corresponds to a new message string "backup failed" in an internationalization compliant application's message catalog. The synchronization engine synchronizes a lookup database for an automation framework with the message catalog based on the modification for the message identifier and/or the message string. For example, the synchronization engine synchronizes a lookup database to include the new message identifier "22305" and the new message string "backup failed" in the message catalog. The synchronization engine assigns the modification for the message identifier and/or the message string to a reference identifier. For example, the synchronization engine assigns the new message identifier "22305" and the new message string "backup failed" to a previously existing reference identifier "201," which is already used by the test script. The new message identifier "22305," the new message string "backup failed," and the previously existing reference identifier "201," are all stored in the lookup database.

The parser parses a test case from a test case suite to identify script instructions to test the internationalization compliant application, wherein the script instructions include the reference identifier. For example, the parser parses a test case to identify script instructions that include the previously existing reference identifier "201." The execution engine executes the script instructions to test the internationalization compliant application, and identifies the message identifier and the message string based on referencing the lookup database using the reference identifier. For example, the execution engine identifies the new message identifier "22305" and the new message string "backup failed" based on referencing the lookup database using the previously existing reference identifier "201." The execution engine validates the message identifier and the message string with the internationalization compliant application. For example, the execution engine validates the new message identifier "22305" and the new message string "backup failed" with the internationalization compliant application. The logger logs a result of executing the script instructions and outputs the result via an output device. For example, the logger outputs the result of validating the new message identifier "22305" and the new message string "backup failed" via an output device. Configuring the automation framework to enable the user to test changing message identifiers and message strings by simply modifying an easily accessible lookup database instead of modifying business logic in the test script produces an automation framework that is optimized, scalable, portable, and more manageable, thereby providing a better total customer experience.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for an automation framework for internationalization compliant applications.

The hard coded business logic for prior art automation frameworks that fail when checking message identifiers and message strings that are changed needs to be reworked. However, hard coded business logic that statically links message identifiers to message strings results in reduced maintainability and scalability for such prior art automation frameworks. Every time that a message identifier and/or a message string changes for an internationalization compliant application, a user may have to modify the test script to create new business logic for a new test case. This prior art solution is not efficient because it comes with a very high operational overhead.

Embodiments herein offer solutions to prior art problems by providing an automation framework for internationalization compliant applications. Configuring the automation framework to enable a user to test changing message identifiers and message strings by simply modifying an easily accessible lookup database instead of modifying business logic in the test script produces an automation framework that is optimized, scalable, portable, and more manageable, thereby providing a better total customer experience.

Figure 2:
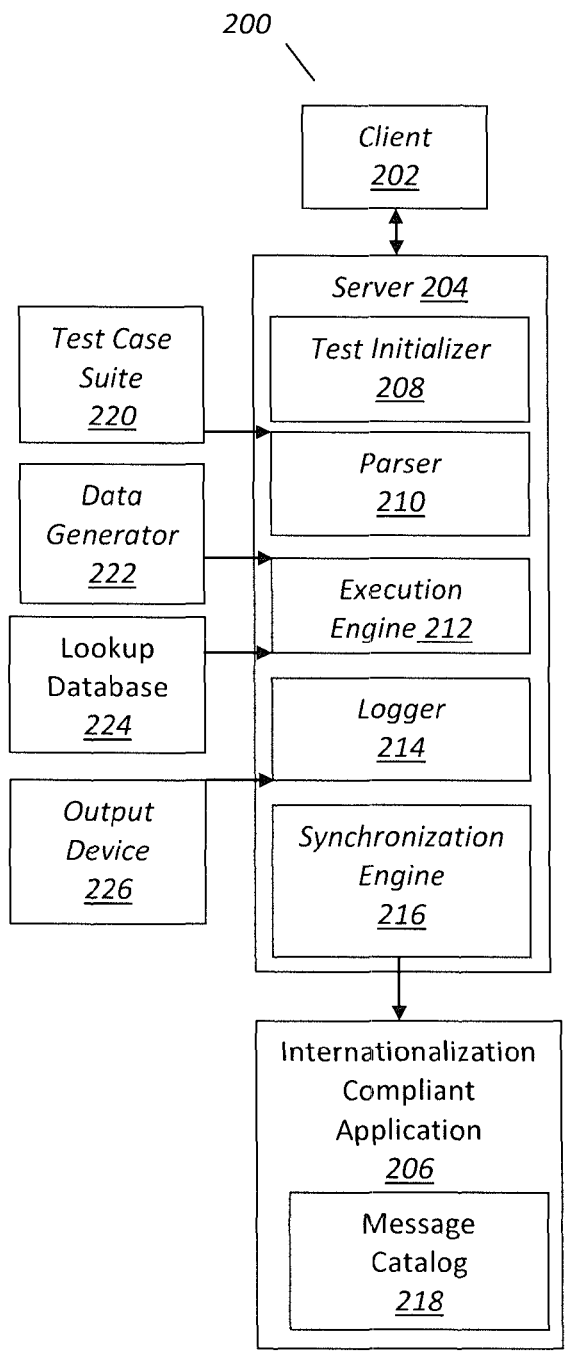
FIG. 2 illustrates a block diagram of an example system for an automation framework for internationalization compliant applications, under an embodiment.

FIG. 2 illustrates a block diagram of a system that implements an automation framework for internationalization compliant applications, under an embodiment. The automation framework may be portable, such that it can test applications in many different environments. The automation framework is scalable, such that the automation framework may test an application on anywhere from one computer to thousands of computers. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of data for different client users.

In an embodiment, the system 200 represents a cloud computing system that includes a client 202 and a server 204 that are provided by a hosting company. Although FIG. 2 depicts the system 200 with one client 202 and one server 204, the system 200 may include any number of clients 202 and any number of servers 204. Each of the client 202 and the server 204 is substantially similar to the system 100 depicted in FIG. 1. The client 202 enables a user to communicate with the server 204, which functions as an automation framework when testing an internationalization compliant application 206. The server 204 executes a test initializer 208, a parser 210, an execution engine 212, a logger 214, and a synchronization engine 216.

The internationalization compliant application 206 stores its message identifiers and message strings in a message catalog 218. The test initializer 208 accesses test cases from a test case suite 220. The execution engine 216 may use data from a data generator 222 to execute a script instruction. The synchronization engine 216 stores message identifiers, message strings, and reference identifiers in a lookup database 224. The logger outputs results to an output device 226 and/or the client 202.

The synchronization engine 216 identifies a modification for a message identifier and/or a message string stored in the message catalog 218 for the internationalization compliant application 206. For example, the synchronization engine 216 parses a current version of the message catalog 218 and compares the parsed current version of the message catalog 218 to a parsed previous version of the message catalog 218 to identify a new message identifier "22305" that corresponds to a new message string "backup failed." The synchronization engine 216 may periodically poll the message catalog 218 to identify any modifications for message identifiers and/or message strings, where modifications include additions, deletions, and changes for message identifiers and/or message strings.

The synchronization engine 216 synchronizes the lookup database 224 with the message catalog 218 based on the modification for the message identifier and/or the message string. For example, the synchronization engine 216 synchronizes the lookup database 224 to include the new message identifier "22305" and the new message string "backup failed" in the message catalog 218. The synchronization engine 216 may synchronize the lookup database 224 with the message catalog 218 using a snapshot computer storage technology or a rsync synchronization technology. Examples of snapshot computer storage technologies include a clone snapshot, a snaps snapshot, and a business continuance volume (BCV) snapshot.

The synchronization engine 216 assigns the modification for the message identifier and/or the message string to a reference identifier. For example, the synchronization engine 216 assigns the new message identifier "22305" and the new message string "backup failed" to a previously existing reference identifier "201," all stored in the lookup database 224. The synchronization engine 216 may output information for the modification of the message identifier and/or the message string to the output device 226 if an automation framework/internationalization compliant application team is required to determine whether to assign a previously existing reference identifier or a newly created reference identifier to the modification for the message identifier and/or the message string. For example, the team members observe that the internationalization compliant application 206 will use the new message identifier "22305" and the new message string "backup failed" in sufficiently similar ways to the previously existing message identifier "45678" and the previously existing message string "error backup," which are assigned to the previously existing reference identifier "201." Therefore, the team members also assign the new message identifier "22305" and the new message string "backup failed" to the previously existing reference identifier "201." Alternatively, the synchronization engine 216 may assign a reference identifier previously stored in the lookup database or a newly created reference identifier.

The test initializer 208 receives user input that identifies the internationalization compliant application 206 for testing and a test case in the test case suite 220 to test the internationalization compliant application 206. A user of the system 200 may use a command line interface, which is a text-only interface, to initiate the automation framework executed by the server 204 via the client 202. A command line interface may be used whenever a large vocabulary of commands or queries, coupled with a wide range of options, can be entered more rapidly as text than can be entered with a pure graphic user interface (GUI).

The parser 210 parses a test case from the test case suite 220 to identify script instructions to test the internationalization compliant application 206, wherein the script instructions include the reference identifier. For example, the parser 210 parses a test case to identify script instructions that include the previously existing reference identifier "201."

The execution engine 212 executes the script instructions to test the internationalization compliant application 206, and identifies the message identifier and/or the message string based on referencing the lookup database 224 using the reference identifier. For example, the execution engine 212 identifies the new message identifier "22305," the previously existing message identifier "45678," the new message string "backup failed," and the previously existing message string "error backup," based on referencing the lookup database 224 using the previously existing reference identifier "201." The execution engine 212 may reference the lookup database 224 by referencing the message catalog 218 using the message identifier and/or the message string linked with the reference identifier in the lookup database 224.

The execution engine 212 validates the message identifier and/or the message string with the internationalization compliant application 206. For example, the execution engine 212 validates the new message identifier "22305" and the new message string "backup failed" with the internationalization compliant application 206. The execution engine 212 generates a result indicating a comparison success if a combination of any referenced message identifiers and any referenced message strings match a corresponding message identifier and a corresponding message string when the test script is executed for the internationalization compliant application 206. The execution engine 212 generates a result indicating a comparison failure if a combination of referenced message identifiers and referenced message strings fail to match a corresponding message identifier and a corresponding message string when the test script is executed for the internationalization compliant application 206.

The logger 214 logs a result of executing the script instructions and outputs the result via the output device 226 and/or the client 202. For example, the logger 214 logs the result of validating the new message identifier "22305" and the new message string "backup failed," which may be stored in a user-configured repository, and outputs the result via the output device 226. The result may enable precise identification of which script instruction identified the failure and when the failure occurred within the sequence of script instructions. If the execution of a particular script instruction failed, was unsupported, or did not run, the batch execution of the application testing does not stop because the server 204 may continue the processing of the next script instruction in the test case. Configuring the automation framework to enable the user to test changing message identifiers and message strings by simply modifying an easily accessible lookup database instead of modifying business logic in the test script produces a configurable automation framework that is optimized, scalable, portable, and more manageable, thereby providing a better total customer experience.

Figure 3:
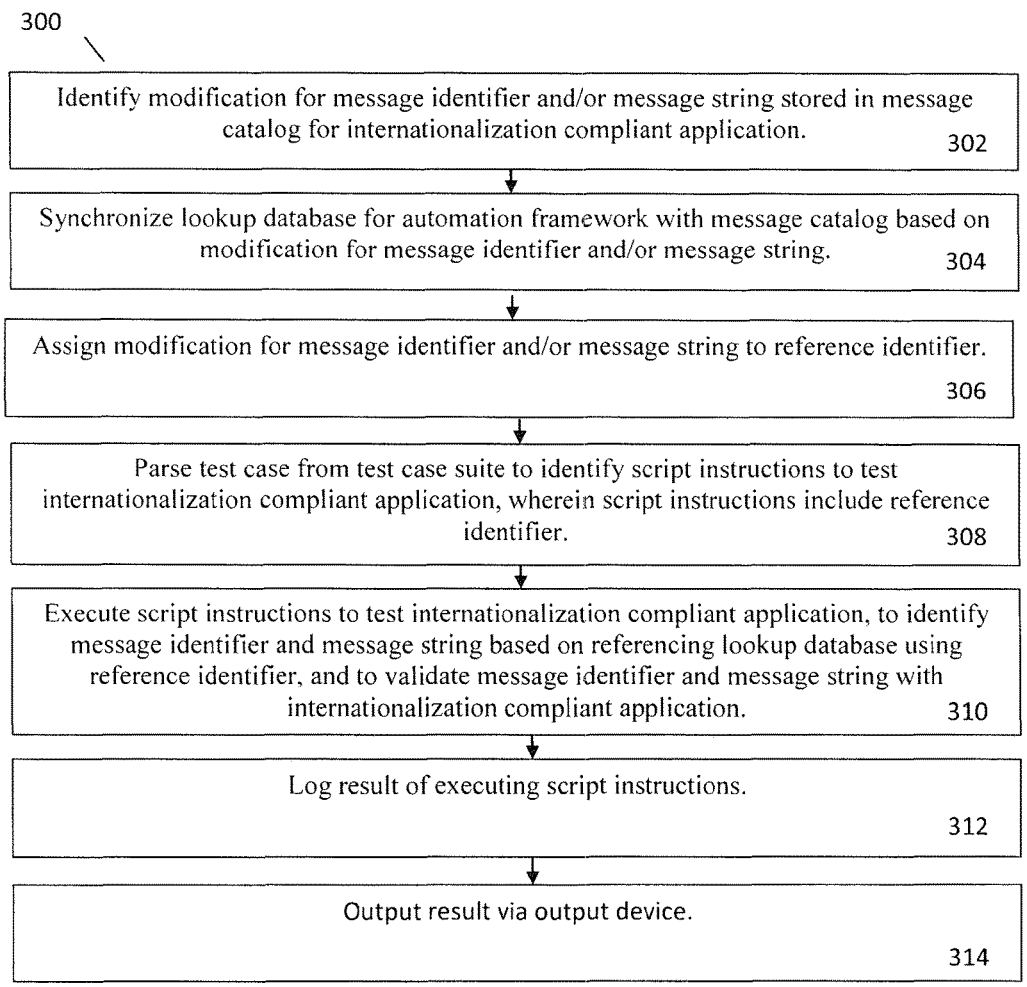
FIG. 3 is a flowchart that illustrates a method of an automation framework for internationalization compliant applications, under an embodiment.

FIG. 3 is a flowchart that illustrates a method of an automation framework for internationalization compliant applications. Flowchart 300 illustrates method acts illustrated as flowchart blocks for certain steps involved in and between the client 202 and the server 204 of FIG. 2.

A modification is identified for a message identifier and/or a message string stored in a message catalog for an internationalization compliant application, act 302. For example, the synchronization engine 216 identifies a new message identifier "22305" that corresponds to a new message string "backup failed" stored in the message catalog 218.

A lookup database for an automation framework is synchronized with a message catalog based on a modification for a message identifier and/or a message string, act 304. For example, the synchronization engine 216 synchronizes the lookup database 224 to include the new message identifier "22305" and the new message string "backup failed" in the message catalog 218.

A modification for a message identifier and/or a message string is assigned to a reference identifier, act 306. For example, the synchronization engine 216 assigns the new message identifier "22305" and the new message string "backup failed" to a previously existing reference identifier "201," all stored in the lookup database 224.

A test case from a test case suite is parsed to identify script instructions to test an internationalization compliant application, wherein the script instructions include a reference identifier, act 308. For example, the parser 210 parses a test case to identify script instructions that include the previously existing reference identifier "201."

Script instructions are executed to test an internationalization compliant application, to identify a message identifier and a message string based on referencing a lookup database using reference identifier, and to validate a message identifier and a message string with an internationalization compliant application, act 310. For example, the execution engine 212 identifies the new message identifier "22305," the previously existing message identifier "45678," the new message string "backup failed," and the previously existing message string "error backup," based on referencing the lookup database 224 using the previously existing reference identifier "201." Then the execution engine 212 validates the new message identifier "22305" and the new message string "backup failed" with the internationalization compliant application 206.

A result of executing script instructions is logged, act 312. For example, the logger 214 logs the result of validating the new message identifier "22305" and the new message string "backup failed".

A result is output via an output device, act 314. For example, the logger 214 outputs the result of validating the new message identifier "22305" and the new message string "backup failed" via the output device 226 and/or the client 202.

Although FIG. 3 depicts the acts 302-314 occurring in a specific order, the acts 302-314 may occur in another order. The automation framework described herein enables a user to test changing message identifiers and messages strings by simply modifying an easily accessible lookup table instead of modifying business logic in the test script, producing an automation framework that is optimized, scalable, portable, and more manageable, thereby providing a better total customer experience.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for an automation framework for internationalization compliant applications, the system comprising:
   a computer having one or more processors; and
   a non-transitory computer readable medium storing a plurality of instructions, executed by the computer to provide:
   a synchronization engine configured to: i) identify a modification for at least one of a message identifier and a corresponding message string stored in a message catalog for an internationalization compliant application, ii) synchronize a lookup database for an automation framework with the message catalog based upon the modification of the at least one of the message identifier and the corresponding message string, and iii) assign the modified at least one the message identifier corresponding to the message string to a reference identifier after synchronizing the lookup database with the message catalog;
   a parser configured to parse a test case to identify script instructions for testing the internationalization compliant application, the identified script instructions including the reference identifier, the message identifier and the corresponding message string being stored within the lookup database that is external to the test script;
   an execution engine configured to test the international compliant application after parsing the test case by executing the identified script instructions, wherein executing the script instructions includes identifying the message identifier and the corresponding message string stored within the lookup database using the reference identifier associated with the message identifier, and to validate the message identifier and the corresponding message string with the internationalization compliant application; and a logger configured to log a result of executing the script instructions, and to output the result via an output device.

2. The system of claim 1, wherein using the reference identifier to identify the corresponding message string stored in the lookup database comprises referencing a message catalog for the internationalization compliant application using the message identifier linked with the reference identifier in the lookup database.

3. The system of claim 1, wherein validating the message identifier and the corresponding message string with the internationalization compliant application comprises generating a result indicating a comparison success in response to the message identifier and the corresponding message string matching a corresponding message identifier and a message string associated with the corresponding message identifier for the internationalization compliant application.

4. The system of claim 1, wherein validating the message identifier and the corresponding message string with the internationalization compliant application comprises generating a result indicating a comparison failure in response to the message identifier and the corresponding message string failing to match a corresponding message identifier and a message string associated with the corresponding message identifier for the internationalization compliant application.

5. The system of claim 1, further comprising a test initializer executed on the computer and configured to receive user input that identifies the internationalization compliant application for testing and a test case to test the internationalization compliant application.

6. The system of claim 5, wherein the test initializer is initiated via a command line interface.

7. The system of claim 1 further comprising a data generator configured to generate application test data for the computer.

8. The system of claim 7, wherein the data generator is one of a file system data generator, a SQL data generator, an exchange data generator, a Sharepoint data generator, and an Oracle data generator.

9. A computer-implemented method for an automation framework for internationalization compliant applications, the method comprising:

identifying a modification to at least one of a message identifier and a message string corresponding to the message identifier, the message identifier and the corresponding message string being stored in a message catalog for an internationalization compliant application;

synchronizing a lookup database for an automation framework with the message catalog based on the modification of the at least one of the message identifier and corresponding message string;

assigning the modified at least one of the message identifier and corresponding message string to a reference identifier after synchronizing the lookup database with the message catalog;

parsing a test case to identify script instructions for testing an internationalization compliant application, the identified script instructions including the reference identifier identifying the message identifier corresponding to the message string, the message identifier and the corresponding message string being stored within a lookup database that is external to the test script;

testing the international compliant application after parsing the test case by executing the identified script instructions, wherein executing the script instructions includes identifying using the reference identifier, the at least one of the message identifier and the message string stored within the lookup database using the reference identifier associated with the message identifier, and to validate the at least one of the message identifier and the message string with the internationalization compliant application;

logging a result of executing the script instructions; and outputting the result via an output device.

10. The method of claim 9, wherein identifying the modification for the at least one of the message identifier and the message string stored in the message catalog for the internationalization compliant application is based on periodically polling the message catalog.

11. The method of claim 9, wherein identifying the modification for the at least one of the message identifier and the message string stored in the message catalog for the internationalization compliant application is based on parsing a current version of the message catalog and comparing a parsed current version of the message catalog to a parsed previous version of the message catalog.

12. The method of claim 9, wherein synchronizing the lookup database for the automation framework with the message catalog based on the modification for the at least one of the message identifier and the message string is synchronized by a synchronization engine.

13. The method of claim 12, wherein the synchronization engine synchronizes the lookup database for the automation framework with the message catalog based on at least one of a snapshot computer storage technology and a rsync synchronization technology.

14. The method of claim 9, wherein assigning the modification for the at least one of the message identifier and the message string to the reference identifier comprises outputting information associated with the modification for the at least one of the message identifier and the message string to the output device.

15. The method of claim 9, wherein assigning the modification for the at least one of the message identifier and the message string to the reference identifier comprises assigning the modification for the at least one of the message identifier and the message string to a reference identifier previously stored in the lookup database.

16. The method of claim 9, wherein assigning the modification for the at least one of the message identifier and the message string to the reference identifier comprises assigning the modification for the at least one of the message identifier and the message string to a reference identifier created for the at least one of the message identifier and the message string.

17. A computer program product, comprising a non-transitory computer-readable medium having a computer-readable program code embodied therein, the computer-readable program code adapted to be executed by one or more processors to implement a method for an automation framework for internationalization compliant applications, the method comprising:

identifying a modification to at least one of a message identifier and a message string corresponding to the message identifier, the message identifier and the corresponding message string being stored in a message catalog for an internationalization compliant application;

synchronizing a lookup database for an automation framework with the message catalog based on the modification of the at least one of the message identifier and corresponding message string;

assigning the modified at least one of the message identifier and corresponding message string to a reference identifier after synchronizing the lookup database with the message catalog;

parsing a test case to identify script instructions for testing an internationalization compliant application, the identified script instructions including the reference identifier identifying the message identifier corresponding to the message string, the message identifier and the corresponding message string being stored within a lookup database that is external to the test script;

testing the international compliant application after parsing the test case by executing the identified script instructions, wherein executing the script instructions includes identifying using the reference identifier, the at least one of the message identifier and the message string stored within the lookup database using the reference identifier associated with the message identifier, and to validate the at least one of the message identifier and the message string with the internationalization compliant application;

logging a result of executing the script instructions; and outputting the result via an output device.

18. The computer program product of claim 17, wherein referencing the lookup database for the automation framework using the reference identifier comprises referencing a message catalog for the internationalization compliant application using the at least one of the message identifier and the message string linked with the reference identifier in the lookup database.

19. The computer program product of claim 17, wherein validating the at least one of the message identifier and the message string with the internationalization compliant application comprises generating a result indicating a comparison success in response to the at least one of the message identifier and the message string matching a corresponding message identifier and a corresponding message string for the internationalization compliant application.

20. The computer program product of claim 17, wherein validating the at least one of the message identifier and the message string with the internationalization compliant application comprises generating a result indicating a comparison failure in response to the at least one of the message identifier and the message string failing to match a corresponding message identifier and a corresponding message string for the internationalization compliant application.

\* \* \* \* \*